No. 705,984. Patented July 29, 1902.
F. O. WELLINGTON.
CONDUIT CLAMP.
(Application filed Oct. 15, 1901.)

(No Model.)

WITNESSES
Katharine A. Dugan.
Geo. N. Goddard

INVENTOR
Frank O. Wellington
By Ira L. Fish
Atty.

UNITED STATES PATENT OFFICE.

FRANK O. WELLINGTON, OF BRAINTREE, MASSACHUSETTS, ASSIGNOR TO FORE RIVER SHIP AND ENGINE COMPANY, OF QUINCY, MASSACHUSETTS, A CORPORATION OF NEW JERSEY.

CONDUIT-CLAMP.

SPECIFICATION forming part of Letters Patent No. 705,984, dated July 29, 1902.

Application filed October 15, 1901. Serial No. 78,705. (No model.)

*To all whom it may concern:*

Be it known that I, FRANK O. WELLINGTON, of Braintree, in the county of Norfolk and State of Massachusetts, have invented certain new and useful Improvements in Conduit-Clamps, of which the following is a specification.

The invention relates to a clamp or clip for supporting or holding in place electric or similar conduits, and is especially useful where conduits are to be secured to metallic structural work—as, for instance, on battle-ships or other iron vessels.

The object of the invention is to provide a simple and inexpensive clamp or clip, which may be readily and conveniently secured in place, and which when in place will efficiently hold the conduit.

To this end the invention comprises a clamp or clip having a substantially U-shaped body for embracing the conduit and projecting clamping-jaws for engaging a projecting flange or plate on the structure upon which the conduit is to be supported, and thus secure the clamp or clip in place.

The U-shaped body of the clamp may be of any suitable shape to embrace the conduit with which it is be used, and the jaws of the clamp may or may not be shaped to embrace a projecting bulb or flange or may be held in place merely by the frictional engagement of the jaws with the sides of a projecting plate. The clamping-jaws, which coöperate with the arms of the body, may be formed in a single piece; but it is preferred to use two separate clamping-jaws, thereby making a lighter clip and one in which the jaws will more readily accommodate themselves to inequalities in the projecting angle, flange, or plate which is engaged by the jaws.

In explaining the invention more in detail I will refer to the accompanying drawings, in which—

Figure 1:
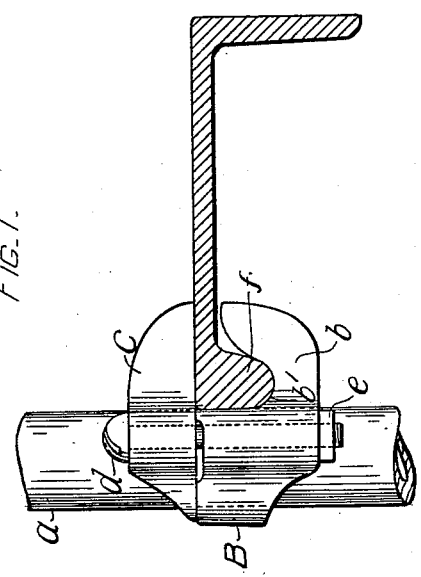
Figure 2:
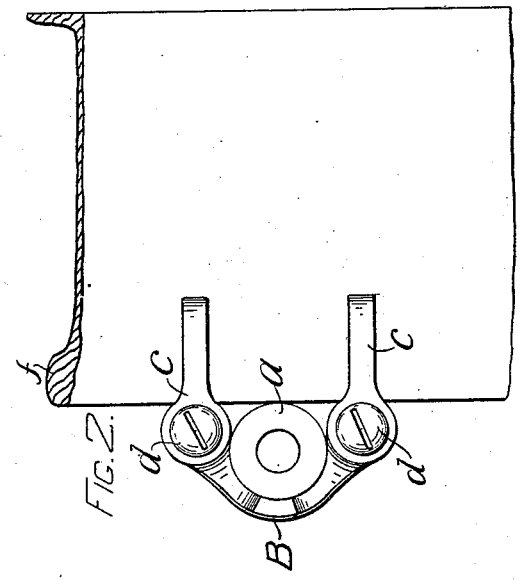
Figure 3:
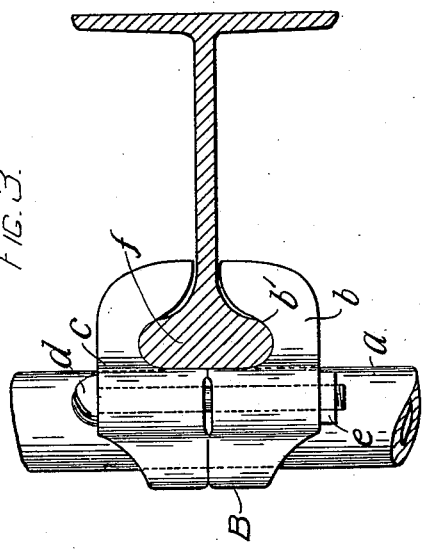
Figure 4:
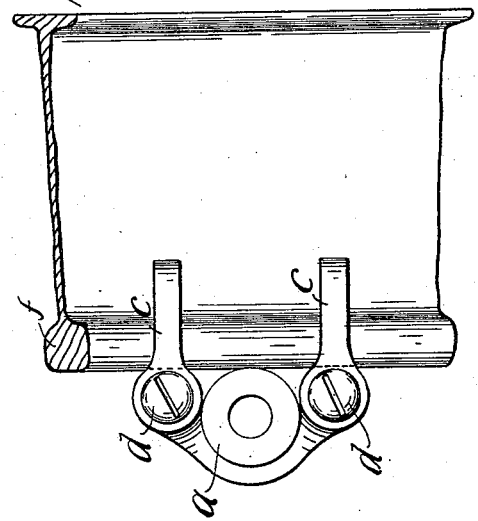

Figure 1 is a side view of a clamp embodying the invention having one set of jaws formed to fit over a projecting flange. Fig. 2 is a plan view of the same. Fig. 3 is a view of a clamp having both sets of jaws formed to fit over a flange or bulb, and Fig. 4 is a plan view of the same.

Referring to the drawings, the body B of the clamp or clip is substantially U-shaped to embrace the conduit $a$, and the arms of the body are extended to form jaws $b$ for engaging one side of a projecting plate or flange of the structure to which the conduit is to be attached.

The clamp is provided with two jaws $c$, coöperating with the jaws $b$ and arranged to engage the opposite side of the flange or plate. The jaws $b$ and $c$ are drawn together to firmly grasp or clamp the plate or flange by means of suitable binding devices—such, for instance, as the screws $d$ and nuts $e$.

This clamp or clip may be readily and conveniently secured to any structural shape having some form of protruding flange or to the edge of a projecting plate without drilling or tapping into the structural work and may be readily removed if it is desired to remove or replace the conduit. The jaws for engaging one or both sides of the projecting flange or plate may be formed to embrace or hook over a protruding flange on the structural work if found desirable. In Figs. 1 and 2 the jaws $b$ are recessed at $b'$ to embrace or hook over a flange $f$, while the engaging surfaces of the jaws $c$ are straight. This is a desirable and efficient form of clamp, which is adapted for attachment to all forms of projecting plates and flanges usually found in structural iron-work. When secured to a plate having a flange, as shown in Fig. 1, the clamp is securely held in place by the engagement of the flange $f$ with the recesses $b'$ in the jaws $b$, as well as by the frictional engagement of the jaws with the sides of the plate. In case the clamp were secured to the edge of a plate having no flange, the recesses $b'$ would perform no active securing function, but the clamp would be held in place by the frictional engagement of the jaws $b$ and $c$ with the opposite sides of the plate. In this form of clamp the jaws $c$ are separate from each other, thus reducing the weight of the clamp and enabling the jaws to more readily accommodate themselves to inequalities in the thickness of the projection to which the clamp is secured.

In Figs. 3 and 4 a clamp is shown in which the jaws $c$ are integrally connected and in which these jaws, as well as the jaws *b*, are provided with recesses to embrace or fit over a flange or bulb *f'* on the plate to which the clamp is secured. This form of clamp, like the form of clamp shown in Fig. 1, may be secured to the form of projection shown in Fig. 1 or to the edge of a projecting plate having no flange, but is especially designed for the form of projection shown in Fig. 2.

It will be observed that the construction is such that no portion of the clamp exerts any pressure upon the conduit supported thereby, since the gripping coaction of the arms of the U-shaped body and the jaws is entirely independent of whatever passes through or rests in the U-shaped portion of said body. This is due to the fact that the jaws which afford the means to coact with the arms of the body are carried directly by said body.

What I claim, and desire to secure by Letters Patent, is—

1. A conduit-clamp comprising a substantially U-shaped body having its arms provided with notches or recesses facing in the same direction to fit over a flange of a beam, and means carried by said body for engaging the opposite side of the beam-flange, whereby said recessed arms will be confined in clamped position without exerting pressure on the conduit.

2. A conduit-clamp comprising a substantially U-shaped body having its arms adapted to engage one side of a beam, and jaws movable toward the sides of the arms of said body, and means for moving both jaws in the same direction to engage the opposite side of a beam from that engaged by the arms of the U-shaped body.

3. A conduit clip or clamp consisting of a U-shaped body having an integral jaw at each end and coöperating jaws attached to said body for securing said body to a projecting plate, the jaws being so arranged relatively to the U-shaped body as to confine a conduit between the U-shaped body and the plate without exerting pressure on the conduit, substantially as described.

In testimony whereof I have affixed my signature in presence of two witnesses.

FRANK O. WELLINGTON.

Witnesses:
   THOMAS A. WATSON,
   HOWARD P. ELWELL.